Jan. 10, 1933.  A. J. MUSSELMAN  1,894,238
HUB ASSEMBLY FOR WHEEL TIRES
Filed April 16, 1930
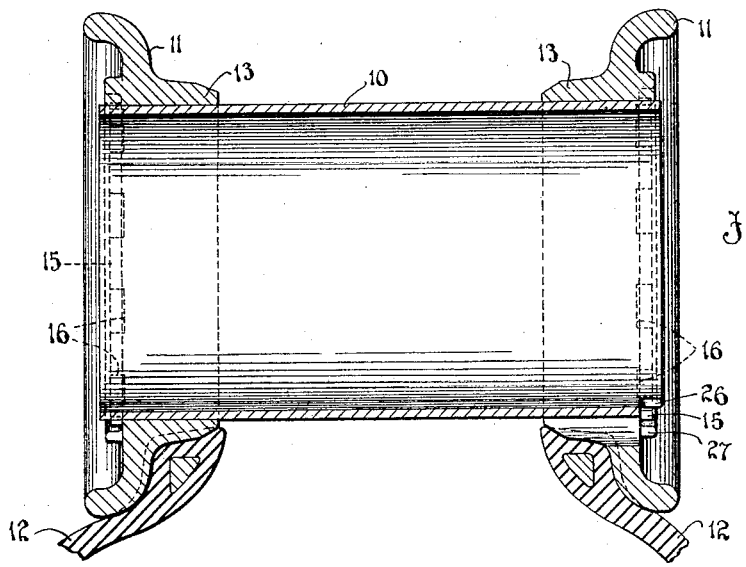
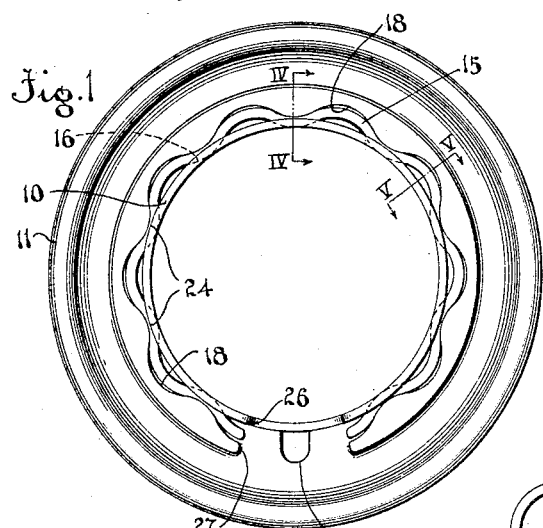
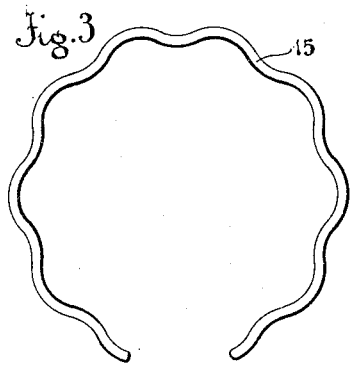
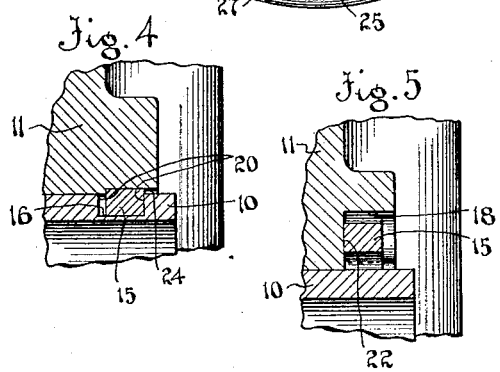
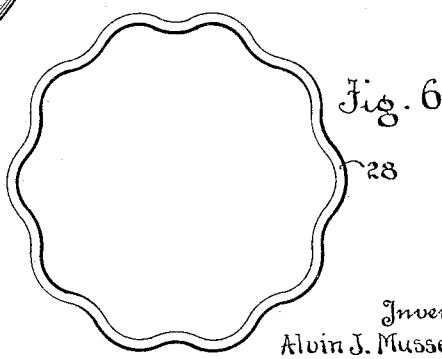
Inventor
Alvin J. Musselman
By
Attorney Patented Jan. 10, 1933

1,894,238

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

HUB ASSEMBLY FOR WHEEL TIRES

Application filed April 16, 1930. Serial No. 444,736.

This invention relates to a vehicle wheel construction and it has particular relation to securing devices for the elements of tire-supporting wheel hubs.

One object of the invention is to provide a simple, efficient and demountable wheel assembly, the elements of which are positively secured against movement from the construction.

Another object of the invention is to provide a securing member that prevents relative movement of elements of a tire having retaining members mounted thereon.

In assembling and operating wheels which include tires of such relatively small inner diameter that they are mounted directly upon a wheel hub, it is advisable to provide a light, strong and rigid assembly of elements and to construct them in such manner that they may be disassembled without difficulty. These conditions are especially desirable in the running gear of aircraft landing equipment. Annular or circumferential tire retaining members of such assemblies must be removable in order to mount a tire upon the hub. According to this invention, a sinuous ring disposed in recesses in the hub and annular circumferentially extending members are provided to prevent relative axial movement and relative rotation of the members.

For a better understanding of the invention, reference may now be had to the accompanying drawing, forming a part of the specification, of which Figure 1 is an end elevational view of an assembly including the invention;

Figure 2 is a fragmentary, cross-sectional view, partially in elevation, showing the manner in which the hub is equipped with tire-retaining members in conjunction with the elements of the invention;

Figure 3 is an elevational view of a ring constructed according to the invention;

Figure 4 is a fragmentary, cross-sectional view taken substantially along the line IV—IV of Figure 1;

Figure 5 is a fragmentary, cross-sectional view taken substantially along the line V—V of Figure 1, and Figure 6 is an elevational view of an endless ring embodying the invention.

Referring to the drawing, a cylindrical hub 10 and flanged tire-retaining rings 11 mounted upon opposite ends of the hub, constitute the principal supporting elements for a pneumatic tire 12, a fragmentary portion of which is shown by Figure 2. Each ring 11 has a cylindrical portion 13, the internal diameter of which is such that it fits snugly about the hub. A sinuous split ring 15, preferably composed of spring steel, is mounted in recesses 16 and 18 formed at intervals circumferentially of the hub 10 and of each ring 11, respectively. Alternate undulations of the sinuous ring are disposed in the recesses 16 and 18, respectively, the latter of which are arranged in substantially staggered relation in the assembled wheel.

It will be observed that each ring 15 cannot be moved axially of the hub because its sides abut opposite walls 20 of each recess 16. Likewise, outward axial movement of each ring 11 tending to displace the ring 15 from either end of the hub 10 is prevented with respect to the ring 15 because it abuts a wall 22 of each recess 18. Spaces 24 between the recesses 18, separating the rings 11 from the periphery of the hub 10, are of such size that the ring 15 cannot move circumferentially and it, therefore, serves as a positive lock to prevent relative rotation of the hub and rings 11. The rings 15 are sprung into their proper positions, wherein their undulations extend into the recesses, and accordingly, their resiliency serves to maintain them firmly in place until they are removed manually or by a suitable tool. A valve stem opening 25 in one of the rings 11 is normally disposed adjacent a recess 26 in the hub 10 and the ring 11 is so formed as to provide a gap 27 which facilitates access to the opening 25.

Air pressure in the tire forces the beads thereof against the rings 11 and prevents the latter from moving away from the rings 15. It is apparent that a sinuous ring 28, similar to the ring 15, may be endless, as shown by Figure 6, and the sinuous formation thereof can compensate for the expansion necessary to spring it over the cylindrical hub and to move it axially of the hub until the undulations snap into the recesses 16 and 18.

Although only the preferred forms of the invention have been shown and described in detail, it will be apparent to those skilled in the art that various modifications may be made therein without departing from the spirit of the invention, or from the scope of the appended claims.

What I claim is:

1. A tire-supporting construction comprising a tire carrying member, tire-retaining annular members mounted thereon, and a sinuous ring removably positioned between the tire carrying member and one of the annular members for positively preventing movement of the annular member from the hub.

2. A tire-supporting construction comprising a cylindrical member, tire-retaining annular members mounted thereon, sinuous split rings positioned between contiguous portions of the cylindrical member and the annular members for locking the cylindrical member and the annular members against relative rotation and relative axial movement at a plurality of circumferentially spaced points.

3. In a tire-supporting construction, a tire-carrying member having radially extending recesses in its periphery, a tire-retaining member having recesses in its radially inwardly disposed face, the tire-retaining member being adapted to slidably fit over the tire-carrying member and a sinuous ring having portions extending into the recesses in the tire-carrying and tire retaining members to lock them against relative axial and rotational movement.

4. In a tire-supporting construction, a tire-carrying member having radially extending recesses in its periphery, a tire-retaining member having recesses in its radially inwardly disposed face, the tire-retaining member being adapted to slidably fit over the tire-carrying member and an endless, sinuous ring having portions extending into the recesses in the tire-carrying and tire retaining members to lock them against relative axial and rotational movement.

5. A wheel comprising a tire bearing member and a removable tire retaining member on said tire bearing member, a resilient open ended wire ring of undulating form having undulations engaged in a series of corresponding slots in one of said members, said wire ring being annularly interlocked with the other of said members whereby to lock the tire bearing member and tire retaining member against relative annular movement.

6. A wheel comprising a tire bearing member provided with a plurality of annularly spaced slots, a removable tire retaining flange on said member and a resilient undulating open ended wire ring surrounding said tire bearing member and having its undulations received within the slots in said member, said wire ring being annularly interlocked with the tire retaining flange, said tire retaining flange being provided with portions overlying said ring to lock the same in place.

In witness whereof, I have hereunto signed my name.

Signed at Akron, in the county of Summit and State of Ohio, U. S. A., this 15th day of April, 1930.

ALVIN J. MUSSELMAN.